Feb. 24, 1925.　　　　　　　　　　　　　　　　1,527,638
D. H. FLOYD
PLOW
Filed May 29, 1923
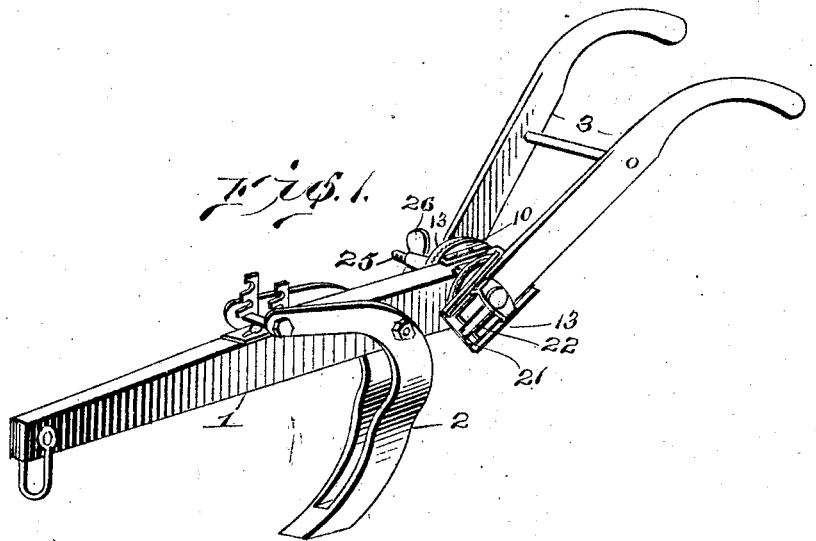
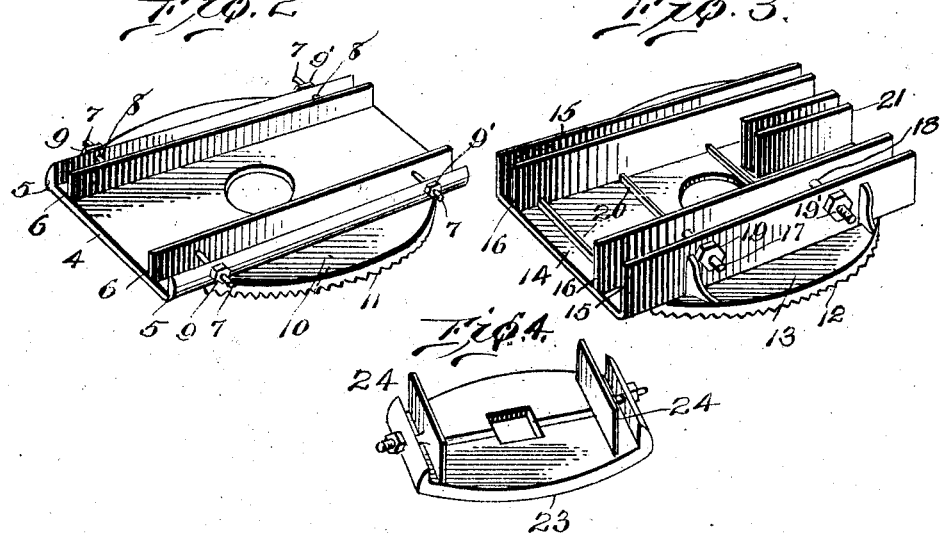
Inventor
David Harward Floyd
By Shreve, Crowe & Gordon
Attorneys An important object of the invention is to provide an improved means for adjusting the handles both longitudinally and angularly with respect to the beam, said means being adjustable to beams and handles of different sizes and susceptible of being kept tight at all times.

Another important object of the invention is to provide means for securing the handles to the beam whereby the said handles may be readily raised and lowered and fixedly secured at any angle desired with respect to the beam.

A further object of the invention is to provide an adjustable connection between the handles and the beam whereby means carried by the beam and means carried by the handles adapted for interlocking engagement one with the other may be locked against displacement at any desired angle of the handles with respect to the beam.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Figure 1 is a perspective view showing the invention in operative position.

Figure 2 is a detailed view of the beam engaging members.

Figure 3 is a detailed view of one of the handle engaging members, and

Figure 4 is a detailed view of one of the washers or outer retaining plate members.

Many efforts have been made to perfect an adjustable connection between the handles and the beam but with more or less scant success.

izing my invention there is shown a plow beam 1, standards 2, and handles 3, of conventional design. In order to effect an adjustable connection between the handles and the beam, I employ the members 4 which on one side are substantially rectangular and are formed with longitudinal upstanding flanges 5. In order to accommodate beams of various dimensions and also to effect a rigid connection with the beam irrespective of its becoming worn or shrinking, the members 4 are equipped with adjustable clamping bars 6 formed with integral lugs or bolts 7 adapted to project through the opening 8 in the flanges 5 and are adjustably secured by the nuts 9 and 9' or other suitable means for engagement with either side of the said flanges 5.

Also if desired either or both of the said members 4 may have the openings 8 in the flanges 5 internally threaded to receive the externally threaded bolts 7' adapted to embed themselves in the beam, as clearly shown in Figure 2 of the drawings.

The opposite sides of the members 4 are formed with slightly raised circular portions 10 with their faces serrated as at 11 adapted for interlocking engagement with corresponding serrations 12 of the raised portion 13 formed on one side of the member 14, said member being adapted for detachable connection with the handles 3, as will hereinafter more fully appear.

The side of the member 14 adapted to contact with the handle, is constructed similar to the corresponding side of the members 4, namely, with longitudinally extending flanges 15 equipped with adjustable clamping member 16, said members being formed with integral lugs or bolts 17 adapted to extend through openings 18 and carrying nuts 19 and 19' for contact with

,527,638

Having thus described my invention, and without enumerating variations and equiva-